United States Patent Office 2,713,006
Patented July 12, 1955

2,713,006

PASTE PIGMENTS

Samuel N. Hunter, East St. Louis, Ill., assignor to Hunter Metallic Products Corporation, East St. Louis, Ill., a corporation of Illinois No Drawing. Application January 7, 1952,
Serial No. 265,360

14 Claims. (Cl. 106—308)

This invention relates to paste pigments. The term "paste pigments" is used herein to describe compositions in which finely divided solids hereinafter called pigments are wetted by and coated with a liquid to form a pasty mass.

While this invention is not confined thereto, it has particular application to metallic pigments. Metallic paste pigments, especially aluminum paste pigments, are known to the art. However, the metallic paste pigments known heretofore have had several disadvantages. The wetting agents used in paste pigments known heretofore have been highly volatile, hygroscopic and inflammable. Special care has had to be used in the handling and storage of such paste pigments. Caking, hardening and hard packing of the pigments with exposure to the atmosphere have been major problems. At the same time, the presence of moisture in such paste pigments has led to excessive internal pressure in the sealed containers in which they must be stored. The tendency for metallic pigments to oxidize, tarnish and discolor with the wetting agents of the paste pigments known heretofore has, as a practical matter, restricted the use of the metallic pigments to aluminum, though even aluminum has not developed its full brightness in such paste pigments.

The paste pigments known heretofore have been entirely incompatible with lacquers, with certain resinous vehicles (such, for example, as polyvinyl chloride), and with certain ink vehicles, among others, so that the fields of their use have been limited.

One of the objects of this invention is to provide paste pigments which are non-hygroscopic, non-oxidizing, non-corrosive, non-hydrolizing in the presence of water, mineral acids or alkalies and non-discoloring, in which hard pigment packing is minimized, which remain soft, thermoplastic and usable indefinitely without special care in storage, which permit the use of a wide variety of pigments (metallic and non-metallic), which preserve and enhance the brilliance of the pigments, and which are compatible with a greater variety of organic compounds than paste pigments known heretofore. Other objects will become apparent to those skilled in the art in the light of the following description.

In accordance with this invention, generally stated, a paste pigment is provided which comprises one or more metallic or non-metallic pigments (which may be in the form of powder, dust, flakes or in other finely divided form) wetted and coated with one or more liquid chlorinated wetting agents. Among the metallic pigments which may be used are aluminum (either polished or un-polished), silver, gold, bronze (of any composition, either bright or russet), lead, antimony, nickel, titanium, copper, iron (especially in its black elemental form), stainless steel, beryllium, zinc, tin, chromium, vanadium and tungsten. Various other metallic pigments may be used as well as mixtures of such pigments. The paste pigments of this invention have a higher degree of brightness and specular gloss than paste pigments known heretofore, and the metallic pigments lose none of their lustre even on in- definitely prolonged exposure to the air and moisture and corrosive environments. Paste pigments of copper and bronze, for example, have heretofore been entirely impractical because of their discoloration or oxidization. However, in the form of paste pigments of the present invention, copper, bronze and even elemental iron (which has been unknown in paste pigment from heretofore), remain undiscolored and unoxidized indefinitely, though exposed to moisture and to corrosive environments such as acid and alkaline atmospheres. Oxides of lead, titanium, iron (black and red), barium, copper, and numerous other metals may be used as pigments. Such materials as slate dust, steatite and pyrophyllite are useful in some applications such as roofings and brick and concrete coatings. Black copper sulphide is useful for marine applications. Barium sulphide is used in producing luminous paints. Carbon black gives a glossy black paste pigment. Barium and lead carbonates are among other pigments which may be used. Other lead pigments, particularly useful in acid environments are the antimoniate, bichromate, chromate, and iodide. Graphite may be used to form a paste pigment with numerous uses, such as thread dressings, and in paints.

Such materials as copper pentochlorophenate may be incorporated in the paste pigments to meet requirements of special applications such as marine paints and the like.

The wetting agents employed in the paste pigments of this invention are chlorinated compounds (or combinations of chlorinated compounds) with or without volatile solvents, which have the general character of chlorinated biphenyl containing approximately 54% chlorine, an oily, light yellow liquid. Chlorinated biphenyls of different chlorine content and various other chlorinated polyphenyls such as chlorinated terphenyl, $C_6H_{5-n}Cl_n$. $C_6H_{4-n'}Cl_{n'}$. $C_6H_{5-n''}Cl_{n''}$ ($n=0$ to 5, $n'=0$ to 4, $n''=0$ to 5, but one of $n$, $n'$ or $n''$ being at least 1), i. e. chlorinated 1, 2-, 1, 3- and/or 1,4-diphenylbenzene (with or without halogenated solvents) are used to obtain particular viscosities in the paste pigments and to meet particular requirements. Illustrative examples of suitable wetting agents in addition to 54% chlorine content chlorinated biphenyl are:

(1) 75%–54% chlorine content chlorinated biphenyl
    25%–48% chlorine content chlorinated biphenyl
(2) 60%–54% chlorine content chlorinated biphenyl
    40%–42% chlorine content chlorinated biphenyl
(3) 50%–54% chlorine content chlorinated biphenyl
    50%–32% chlorine content chlorinated biphenyl
(4) 90%–21% chlorine content chlorinated biphenyl
    10%–48% chlorine content chlorinated biphenyl
(5) 95%–100% 21% chlorine content chlorinated biphenyl
    5%–0% trichloroethylene
(6) 95%–100% 48% chlorine content chlorinated biphenyl
    5%–0% trichloroethylene
(7) 95%–100% 54% chlorine content chlorinated biphenyl
    5%–0% trichloroethylene
(8) 70%–21% chlorine content chlorinated biphenyl
    20%–48% chlorine content chlorinated biphenyl
    10%–54% chlorine content chlorinated biphenyl
(9) 75%–21% chlorine content chlorinated biphenyl (a colorless mobile oil)
    25% trichloroethylene In those examples in which trichloroethylene is given as a solvent, other chlorinated solvent such, for example, as carbon tetrachloride, orthodichlorobenzene (which is toxic to fungi), and others may be used, though trichloroethylene is preferred for most applications.

The pigments and wetting agents are mixed and/or kneaded by any suitable means such as mullers, extrusion mills, tumblers, ball mills, baker's dough-type mixers, or the like, to wet and coat the pigments uniformly and thoroughly with the wetting agents. The leafing of such pigments as aluminum, copper and bronze flakes is quick and complete.

The advantages in the use of paste pigments over the use of dry pigments are readily apparent. Paste pigments may be readily incorporated into paint vehicles and the like without the "fog-out" of the fine dust which gives rise not only to the loss of material but to a health hazard as well. In addition, particularly with the paste pigments of the present invention, a better and more uniform dispersion in paint or other vehicles with shorter grinding time and in many cases without additional grinding, is possible. The versatility of the paste pigments of this invention, as compared with the paste pigments of the prior art, practically eliminates the need for the stocking of dry powders.

Paste pigments of this invention can be used in a wide variety of fields as indicated in the illustrative examples below. By varying the composition of the wetting agent and the quantity and character of pigments, paste pigments are produced which may be used directly as putties, as thread dressings, caulking compounds, among others, and may be used as ingredients of paints, lacquers, enamels, mastics, adhesives, inks, cements, and even the polyvinyl chloride "cocoons" now used by the Navy to preserve ships not in use. Numerous other uses will occur to those skilled in the art.

Illustrative examples of paste pigments in accordance with this invention are as follows:

Example I

A paste pigment useful as an ingredient of a large variety of products including paints, enamels, lacquers, inks and adhesives is made of the following components, by weight:

| | Parts |
|---|---|
| 54% chlorine content chlorinated biphenyl | 60 |
| Finely powdered aluminum | 40 |

The components are thoroughly mixed to wet and coat each particle of pigment, to form a homogeneous composition by any suitable mixing means, as for example a muller or a tumbler. The paste pigment of this composition is stable at high temperatures, non-inflammable, acid-, alkali- and salt-resistant, brilliant, quick and thorough-leafing, and easily dispersed. It remains homogeneous, soft and usable indefinitely though exposed to the atmosphere and corrosive environments.

Paste pigments useful as ingredients of printing inks are illustrated by the compositions of Examples II–V as follows:

Example II

| | Parts |
|---|---|
| Wetting agent 5 above | 85–90 |
| Pigment | 15–10 |

The use of a minor proportion of trichloroethylene, not over 5% of the weight of the wetting agent, expedites the wetting of the pigment. The same observation applies to Examples III and IV.

Example III

| | Parts |
|---|---|
| Wetting agent 6 above | 85–90 |
| Pigment | 15–10 |

Example IV

| | Parts |
|---|---|
| Wetting agent 7 above | 85–90 |
| Pigment | 15–10 |

Example V

| | Parts |
|---|---|
| Wetting agent 8 above | 85–90 |
| Pigment | 15–10 |

Example V is illustrative of the use of mixtures of chlorinated biphenyls of different chlorine content. The proportions of the different components of the wetting agent may be varied from equal proportions of each of the components to none of one or more of the components.

Example VI

A paste pigment suitable for use as an ingredient of a putty is made of the following components by weight:

| | Parts |
|---|---|
| Wetting agent 4 above | 90–92 |
| Metallic pigment | 8–10 |

Example VII

A paste pigment suitable for use in fast-drying interior paint without the use of driers may be made of the following components, by weight:

| | Parts |
|---|---|
| Wetting agent 9 above | 46–60 |
| Pigment | 54–40 |

Example VIII

A paste pigment suitable for use with polyvinyl chloride to form a highly reflecting pigmented film is made of the following components by weight:

Wetting agent consisting of
    50%–48% chlorine content chlorinated biphenyl.
    50%–54% chlorine content chlorinated biphenyl, 46 parts.
Pigment (aluminum powder) 54 parts.

The addition of 12% of the above paste pigment to the polyvinyl chloride is sufficient.

Example IX

A paste pigment suitable for use as a pipe thread compound or as an ingredient of paint is made of the following components by weight:

| | Parts |
|---|---|
| Wetting agent 1 above | 50 |
| Graphite | 50 |

Example X

A paste pigment suitable for use as an ingredient of paint is made of the following components by weight:

| | Parts |
|---|---|
| Wetting agent 2 above | 46–60 |
| Titanium dioxide | 54–40 |

Example XI

A paste pigment suitable for use as an ingredient of paints is made of the following components by weight:

| | Parts |
|---|---|
| Wetting agent 3, above | 46–60 |
| Elemental iron | 54–40 |

A convenient form of iron powder for use with this and similar formulations is the so-called Carbonyl Iron Powder.

Example XII

A paste pigment suitable for making luminous paint is made of the following components by weight:

| | Parts |
|---|---|
| 54% chlorine content chlorinated biphenyl | 46–60 |
| Pigment (Barium sulphide) | 54–40 |

Unlike the linseed oil-turpentine pastes of the prior art, this composition is stable, non-oxidizing, non-inflammable and non-volatile.

Example XIII

A paste pigment suitable for use as a roofing compound is made of the following components by weight:

| | Parts |
|---|---|
| Wetting agent 1, above | 40 |
| Talc, steatite, or slate dust | 60 |

Such a roofing composition has numerous advantages over asphaltic roofing compositions. It does not soften with heat, nor become brittle with age and it is non-inflammable.

The examples given are, of course, merely illustrative. In paste pigment for use in paints, concentrations of pigment of 74% may be used, for example. The proportions of chlorinated polyphenyls of different chlorine content in the wetting agent, the proportions of wetting agent to pigment, and the character of the pigments may be varied. The substitution of any of the other pigments described for the aluminum of Example I, for instance, will yield a useful paste pigment. Mineral acid-resistant paste pigments which also give acid-resistant coatings, may be made up with mixtures of 21% and 48% chlorine content chlorinated biphenyl. Straight 48% chlorine content chlorinated biphenyl may be used to make up a salt-resistant paste pigment. The biphenyls of less than 54% are not entirely non-inflammable but burn with difficulty and will not support combustion when removed from an open flame.

The term "polyphenyl" is used herein to designate a compound consisting of two or more linked phenyl radicals, e. g. biphenyl, terphenyl, tetraphenyl, and the isomers thereof.

The phrase "liquid chlorinated polyphenyl" is used herein to designate those chlorinated polyphenyls which are liquid at normal temperatures, i. e. between about 40° and 120° F. In general, these are chlorinated biphenyls and mixtures of chlorinated biphenyls of from approximately 19% to 55% chlorine content, liquid mixtures of such liquid chlorinated biphenyls with chlorinated biphenyls which are not normally liquid, and liquid mixtures of liquid chlorinated biphenyls with chlorinated polyphenyls having more than two phenyl radicals which are not normally liquid. It also includes those chlorinated biphenyls, mixtures of chlorinated biphenyls, and mixtures of chlorinated biphenyls and chlorinated polyphenyls having more than two phenyl radicals, to which a volatile solvent is added, when those compositions are liquid before the solvent has been added thereto. It is to be understood, furthermore, that liquid chlorinated polyphenyls to which are added diluents, plasticizers, thinners and the like which do not lessen the pigment wetting properties of the liquid chlorinated polyphenyls, are included within the compass of the phrase "liquid chlorinated polyphenyl" as used in the specification and the appended claims.

For example, in order to expedite wetting and coating, or to obtain a thinner coating of pigment particles than is otherwise possible, a thinner or solvent may be added to a liquid chlorinated polyphenyl before pigment is wetted and coated therewith. As a further example, in producing a paste pigment for a particular purpose, (as for use with nitrocellulosic vehicles), a plasticizer (such, as in the case of paste pigment for nitrocellulosic vehicles, tricresyl phosphate) may be added to a liquid chlorinated polyphenyl before pigment is wetted and coated therewith.

Examples of paints and mastics which may be produced from paste pigments of this invention are set forth in my application Serial No. 32,728, filed June 12, 1948, now abandoned, of which this application is a continuation in part.

The paste pigments of this invention are compatible with asphalt, benzyl cellulose, carnauba wax, cellulose aceto butyrate, chlorinated rubber, "Plyolite," coumarone and indene resins, dammar resin, ester gum, ethyl cellulose, nitrocellulose, paraffins, chlorinated paraffins, polystyrene resins, polyisobutylene, rosin, rubber, styrene-butadiene co-polymers, vinyl resins, linseed oil, aromatics, turpentine, gasoline, benzene, diacetone, mineral spirits, xylene, esters such as amyl acetate, dibutyl phthalate, ethyl lactate and tricresyl phosphate, and numerous other organic materials. They are thus adapted to use in a wide variety of fields not open to the paste pigments known heretofore.

Paste pigments of this invention used in paints, not only give a higher gloss and smoother coverage, with no piling or lumping, but give better coverage than the paste pigments known heretofore. For example, a paint containing 20 ounces of the 40% aluminum paste pigment of Example I per gallon of paint gives better coverage than a paint containing 32 ounces per gallon of a paste pigment consisting of 74% aluminum and 27% mineral spirits, a paint which now meets Government specifications, all of the remaining constituents being the same.

Paints, putties, inks and the like made up with the paste pigments of this invention exhibit a high degree of adhesion. The paste pigments also have high dielectric strength and low power factor.

Numerous variations within the scope of the appended claims will be apparent to those skilled in the art in the light of the foregoing description.

Thus it can be seen that paste pigments are provided which not only accomplish the objects set forth, but are economical, versatile, efficient and convenient to use.

Having thus described my invention what is claimed and desired to be secured by Letters Patent is:

1. A paste pigment composition containing pigment matter wetted and coalesced with a wetting agent comprising 25 to 80 per cent of liquid chlorinated polyphenyl, having a chlorine content of not more than approximately 60 per cent to form a soft, or plastic pigment composition which is permanently useful and has increased utility and high dielectric strength.

2. A paste pigment composition containing finely divided particles of a non-ferrous metal, wetted and coalesced with a wetting agent comprising 25 to 80 per cent of liquid chlorinated polyphenyl, having a chlorine content of not more than approximately 60 per cent to form soft, or plastic pigment composition which is permanently useful and has increased utility.

3. A paste pigment composition containing finely divided particles of a ferrous metal, wetted and coalesced with a wetting agent comprising 25 to 80 per cent of liquid chlorinated polyphenyl, having a chlorine content of not more than approximately 60 per cent to form soft, or plastic pigment compositions having unusual utility.

4. A paste pigment composition containing natural or manufactured graphite wetted and coalesced in a wetting agent comprising 25 to 80 per cent of liquid chlorinated polyphenyl, having a chlorine content of not more than approximately 60 per cent.

5. A paste pigment composition containing an admixture of ferrous and non-ferrous metal particles wetted and coalesced in a wetting agent comprising 25 to 80 per cent of liquid chlorinated polyphenyl, having a chlorine content of not more than approximately 60 per cent to form a paste pigment having unusual utility.

6. A paste pigment composition comprising an admixture of organic and inorganic pigment matter wetted and coalesced in a wetting agent comprising 25 to 80 per cent of liquid chlorinated polyphenyl, having a chlorine content of not more than approximately 60 per cent to form a soft, or plastic permanently useful pigment composition having unusual utility.

7. A paste pigment composition containing gelatinous or absorbent pigment matter taken from the group consisting of alumina, silica, bentonite, montmorillonite, fuller's earth, or clays wetted and coalesced with a wetting agent comprising 25 to 80 per cent of liquid chlorinated polyphenyl, having a chlorine content of not more than approximately 60 per cent.

8. A paste pigment composition containing an admixture of gelatinous or absorbent pigment matter with organic or inorganic pigment wetted and coalesced in a wetting agent comprising 25 to 80 per cent of liquid chlorinated polyphenyl, having a chlorine content of not more than approximately 60 per cent to form a pigment composition having unusual utility.

9. Permanently useful, durable, and improved paste pigment compositions containing metal or non-metal pigment wetted and coalesced in a wetting agent comprising 25 to 80 per cent of a liquid chlorinated compound of the character of chlorinated biphenyls or chlorinated polyphenyls, having a chlorine content of not more than approximately 60 per cent to form soft, or plastic pigment compositions having high specular gloss and brilliance, improved container stability, increased utility and which are flame, oxidation, corrosion, acid, alkali, fungi and water resistant.

10. A cold or hot mixed pigment composition containing organic or inorganic pigment matter wetted and coalesced with a wetting agent comprising 25 to 80 per cent of a liquid chlorinated compound of the character of chlorinated biphenyl or chlorinated polyphenyl, having a chlorine content of not more than approximately 60 per cent, to form a soft, or plastic pigment composition having improved container stability and unusual utility.

11. A paste pigment composition containing finely divided carbonyl iron wetted and coalesced with a wetting agent comprising 25 to 80 per cent of liquid chlorinated polyphenyl, having a chlorine content of not more than approximately 60 per cent.

12. A paste pigment composition containing pigment matter wetted and coalesced with 25 to 80 per cent by weight of the paste pigment of liquid chlorinated polyphenyl having a chlorine content of not more than approximately 60 per cent.

13. A plastic pigment composition containing cuprous oxide wetted and coalesced in a wetting agent comprising 25 to 80 per cent of a liquid chlorinated compound of the character of chlorinated biphenyls and chlorinated polyphenyls having a chlorine content of not more than 60 per cent, useful as the pigment in fungicidal paints and protective coatings.

14. A plastic pigment composition containing pigment taken from the group consisting of chrome yellow, zinc oxide and basic lead chromate, wetted and coalesced in a wetting agent comprising 25 to 80 per cent of liquid chlorinated polyphenyl, having a chlorine content of not more than 60 per cent, as the pigment in anti-corrosive paints and protective coatings.

References Cited in the file of this patent

UNITED STATES PATENTS

| | | |
|---|---|---|
| 2,028,716 | Delaney | Jan. 21, 1936 |
| 2,111,395 | Hartwick | Mar. 15, 1938 |
| 2,185,194 | Harris | Jan. 2, 1940 |
| 2,420,644 | Athy et al. | May 20, 1947 |
| 2,444,752 | Siegler | July 6, 1948 |
| 2,472,680 | Pratt | June 7, 1949 |
| 2,476,235 | Benignus | July 12, 1949 |
| 2,570,856 | Pratt et al. | Oct. 9, 1951 |
| 2,591,245 | Edwards | Apr. 1, 1952 |

OTHER REFERENCES

Edward's "Aluminum Paint & Powder," New York, 1936, page 131.

"Aroclors," Application Data Bulletin No. P-115, Monsanto Chem. Co., St. Louis, pages 1-20. Received Dec. 10, 1945.

"Paint and Varnish Technology," von Fischer, 1948, Reinbold Publishing Corp., New York, N. Y., page 309.